(No Model.)
W. G. BECKWITH.
BELT TIGHTENER FOR COTTON GINS.
No. 493,204. Patented Mar. 7, 1893.
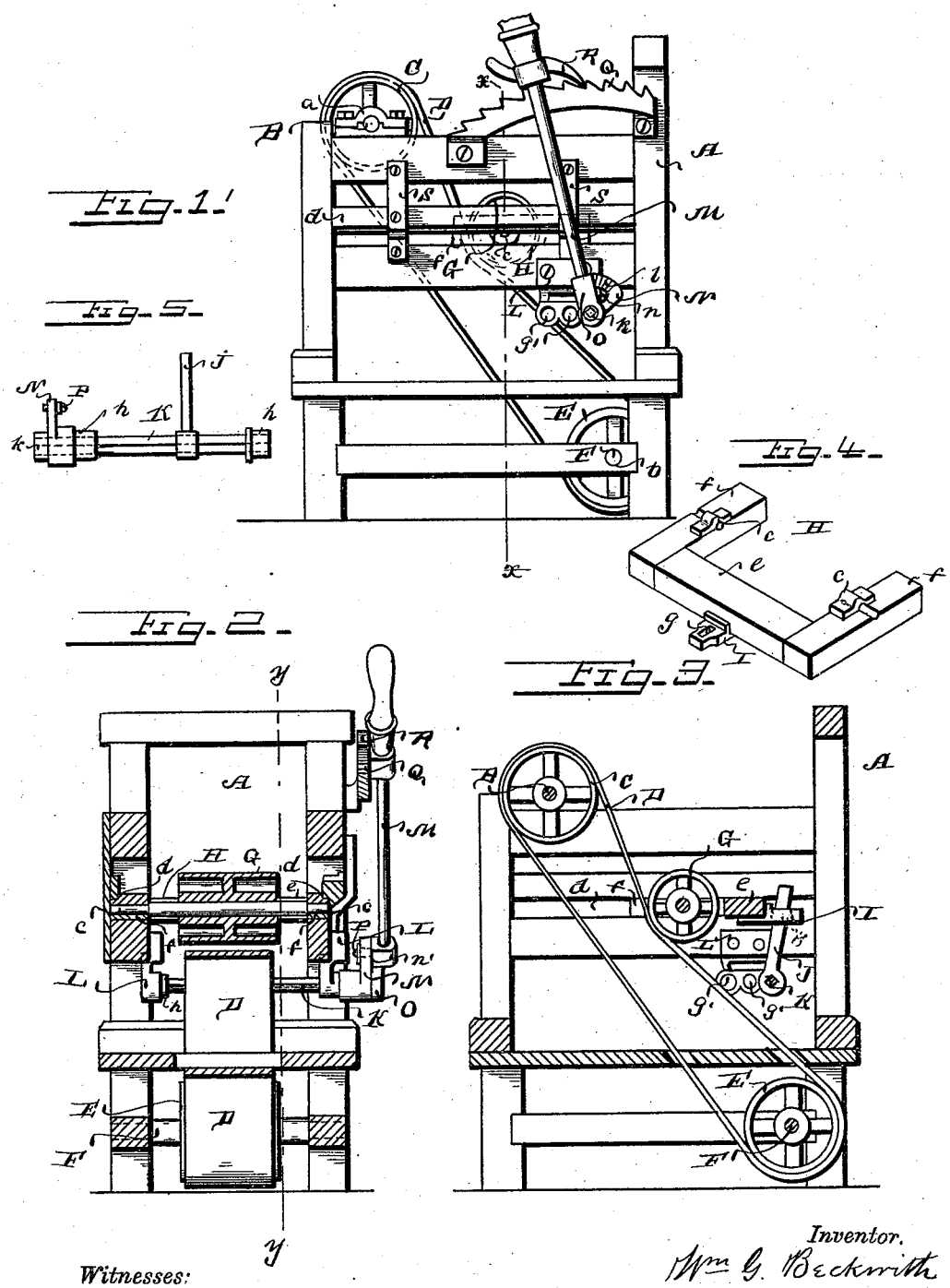
Witnesses:
Jesse Heller
Philip C. Masi
Inventor.
Wm. G. Beckwith
by E. W. Anderson
his Attorney.

UNITED STATES PATENT OFFICE.

WILLIAM G. BECKWITH, OF PRATTVILLE, ALABAMA, ASSIGNOR TO THE DANIEL PRATT GIN COMPANY, OF SAME PLACE.

BELT-TIGHTENER FOR COTTON-GINS.

SPECIFICATION forming part of Letters Patent No. 493,204, dated March 7, 1893.

Application filed October 1, 1892. Serial No. 447,498. (No model.)

*To all whom it may concern:*

Be it known that I, WILLIAM G. BECKWITH, a citizen of the United States, and a resident of Prattville, in the county of Autauga and State of Alabama, have invented certain new and useful Improvements in Belt-Tighteners for Cotton-Gins; and I do declare the following to be a full, clear, and exact description of the invention, such as will enable others skilled in the art to which it appertains to make and use the same, reference being had to the accompanying drawings, and to letters of reference marked thereon, which form a part of this specification.

Figure 1 of the drawings is a side elevation of the machine. Fig. 2 is a vertical longitudinal section taken on line $x.\,x.$ Fig. 1. Fig. 3 is a vertical transverse section taken on line $y.\,y.$ Fig. 2. Fig. 4 is a detail perspective view of the reciprocating frame, with the pulley removed. Fig. 5 is a detail view of the rock bar or shaft, its arm, bushings and sector plate.

This invention has relation to belt tighteners for cotton gins, the object being to provide a simple and effective device for starting and stopping the gin by means of tightening and loosening the driving belt; and the invention consists in the novel construction and combination of parts, all as hereinafter specified.

Referring to the accompanying drawings, the letter A designates a suitable frame, which may be an extension of the frame of the gin, and is provided at $a, a$, with bearings for the driving shaft B of the gin, said shaft carrying between said bearings the driving pulley C.

D is the loose driving belt, which runs down through the frame, and is driven by the pulley E on the line shafting F, which may have bearings at $b, b$, in the base of the frame.

G is the idler or tightener pulley, which is supported by bearings $c, c$, in a horizontally adjustable frame H, working in ways or guides $d, d$, in the lateral portions of the frame A. Said frame H comprises the transverse bar $e$, and the lateral arms $f, f$, which work in the guides $d, d$, and which carry the boxes or bearings $c, c$. Affixed to the transverse bar $e$ is a plate I, having therein an oblong vertical slot $g$, which receives an arm or crank J, secured to a rock-shaft or bar K. Said rock-bar or shaft has bearings in brackets L, L, each of which is affixed to each side of the frame, and in order that the bar or shaft K may be adjusted to compensate for the stretch of the belt, without necessitating the cutting or resewing of the same, said brackets are provided with a series of three or more bearings $g'$, as indicated.

$h, h$, are bushings for the bar or shaft, where it runs through the bearings $g'$.

$k$ is a bushing on the outer end of said bar or shaft, and which is provided with a device for changing the position of the operating or shifting lever M. Said device comprises a sector plate N, integral with the bushing, and provided on its outer face with notches or serrations $l$, and with an arcuate slot $n$. On the socket O, which receives the lower end of the lever M, are similar engaging notches or serrations $n'$. By means of a screw P, running through said slot from the back, the socket may be rigidly clamped to the desired position.

For the purpose of holding the tightening pulley in position, a curved rock-bar or plate Q is affixed to the upper lateral portion of the frame, and a pawl or detent R is provided on the lever for engagement therewith. It will be apparent that by moving the lever backward and forward, the tightening pulley will be carried into and out of contact with the driving belt, which it tightens or loosens sufficiently to start or stop the gin.

S, S, are clamps or brackets which serve to bind and strengthen the frame.

Having described this invention, what I claim as new, and desire to secure by Letters Patent, is—

1. In a belt tightener for cotton gins, the combination of the driving belt, of the pulley arranged to be carried into contact with said belt, the adjustable frame carrying said pulley, the slotted plate affixed to said frame, the rock-bar or shaft, the arm or crank thereof engaging the slot of said plate, and the operating lever affixed to said bar or shaft, substantially as specified.

2. The combination of a loose driving belt, of a tightener pulley, a horizontally adjustable frame carrying said pulley, a rock-bar or shaft, a connection between said bar or shaft and the frame for adjusting the latter, the brackets having a series of bearings for said bar or shaft, and the operating lever affixed to said bar or shaft, and its rack and detent, substantially as specified.

3. The combination with the supporting frame, the tightener pulley, its slidable frame, the rock-bar or shaft operating said frame, and the operating lever, of the bearing brackets having each a plurality of bearings, the bushing, the toothed and slotted sector plate integral with one of said bushings, the lever socket having a toothed face engaging said sector, and the securing screw, substantially as specified.

4. The herein described belt-tightening and loosening device, comprising an idler pulley, an adjustable frame carrying said pulley and working in guides in the supporting frame, the rock-bar or shaft having an operating connection with said adjustable frame, an operating lever affixed to said bar or shaft, and means for effecting the adjustment of the bar or shaft, and of the lever, substantially as specified.

In testimony whereof I affix my signature in presence of two witnesses.

W. G. BECKWITH.

Witnesses:
DANIEL PRATT,
THOMAS A. FAY.